No. 704,145. Patented July 8, 1902.
F. W. TALLEY.
ATTACHMENT FOR BICYCLES.
(Application filed Jan. 11, 1902.)
(No Model.)
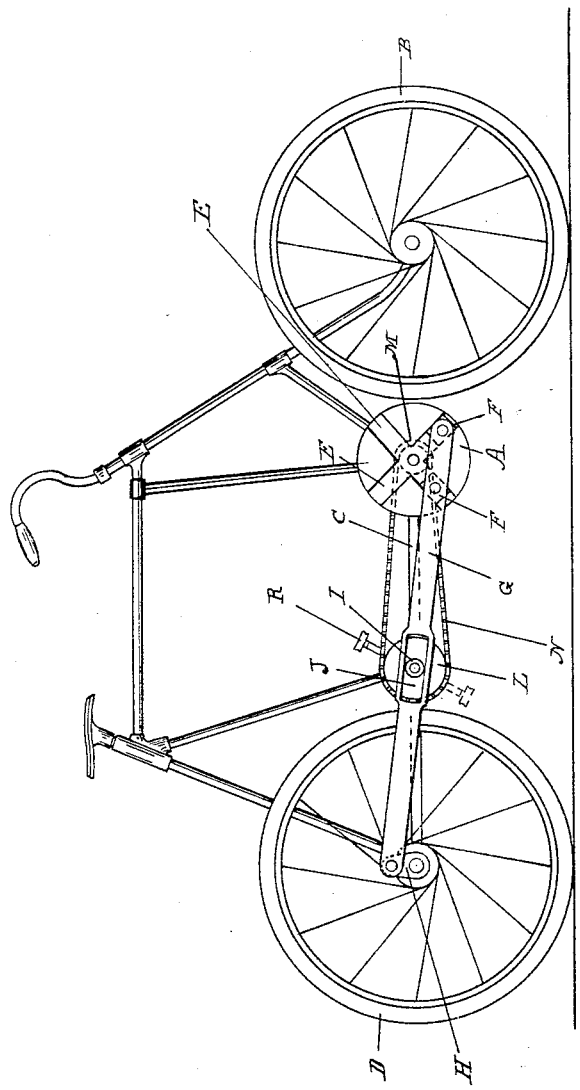
WITNESSES:
INVENTOR
Felix W. Talley
BY
Stephen W. Wood
ATTORNEY

UNITED STATES PATENT OFFICE.

FELIX W. TALLEY, OF NEW YORK, N. Y.

ATTACHMENT FOR BICYCLES.

SPECIFICATION forming part of Letters Patent No. 704,145, dated July 8, 1902.

Application filed January 11, 1902. Serial No. 89,383. (No model.)

*To all whom it may concern:*

Be it known that I, FELIX W. TALLEY, a citizen of the United States, residing at Dougherty's hotel, in the city of New York, State of New York, have invented new and useful Improvements in Attachments for Bicycles, of which the following is a specification.

My invention relates to an attachment adapted to be applied to bicycles and other similar vehicles; and the object of my invention is with a given number of revolutions of the pedals to double the speed of the bicycle. This object is attained by the mechanism illustrated in the accompanying drawing, in which a bicycle of ordinary construction having my attachment applied thereto is represented.

The usual frame, sprocket-wheels, and endless chain employed in ordinary bicycles are represented, a detailed description thereof being omitted as unnecessary to a clear description and understanding of the construction, arrangement, and operation of my attachment applied thereto. This attachment consists of a disk A, mounted upon the lower bar C of the frame and located in alinement between the wheels B D, the face of this disk having ways or T-shaped grooves E, formed therein and at right angles, crossing each other at the center and forming an open space, as represented. Blocks F F are fitted to slide back and forth in the ways E E and pivoted to one end of a connecting-rod G, the other end of which rod connects with a crank H, secured to the axle of the driving-wheel D, as shown.

In order to obtain the required movements of the blocks F F to produce two revolutions of the crank H to each revolution of the disk A, the connecting-rod G, pivoted to the crank H and to the blocks F F, respectively, is slotted centrally and fitted with a friction-wheel I, pivoted to the bar C of the frame, which wheel I serves also as a pivot upon which the connecting-rod G may vibrate vertically to operate the crank H, the slot J permitting a longitudinal movement of the connecting-rod to compensate for the stroke of the crank H and movements of the sliding blocks F F in the disk A.

To speed the disk A, to which one end of the connecting-rod G is pivoted, sprocket-wheels L M and endless chain N and treadles R are employed in the usual manner in bicycles.

The operation of my attachment applied to a bicycle may be briefly described as follows: It will be observed that the mechanism of the attachment mounted upon the frame is arranged in alinement between the axles of the two wheels of the bicycle, so that at every revolution of the disk A, revolved by means of the sprocket-wheels and endless chain, the connecting-rod G will have completed two vibrations, and consequently the driving-wheel D will have been revolved twice to each revolution of the disk A.

Having described my invention, what I claim therein as new, and desire to secure by Letters Patent, is—

In combination with a bicycle an attachment consisting of a rotary disk having intersecting grooves and blocks fitted so as to slide back and forth therein, a connecting-rod pivoted at one end to the sliding blocks its opposite end being connected to a crank secured to the shaft of the driving-wheel, the connecting-rod slotted centrally so as to admit of longitudinal and vibrating movements over a fulcrum secured to the frame of the vehicle substantially as herein set forth and shown.

In testimony whereof I have signed my name to this specification, in the presence of two subscribing witnesses, this 5th day of September, 1901.

FELIX W. TALLEY.

Witnesses:
NATHAN BURKAN,
KATHRYN BROSNAN.